(12) United States Patent
Yasui et al.

(10) Patent No.: US 7,506,107 B2
(45) Date of Patent: Mar. 17, 2009

(54) SHARED MEMORY MULTIPROCESSOR SYSTEM

(75) Inventors: Takashi Yasui, Kokubunji (JP); Shisei Fujiwara, Yokohama (JP); Norihiko Murata, Hadano (JP)

(73) Assignee: Hitachi, Ltd., Tokyo (JP)

( * ) Notice: Subject to any disclaimer, the term of this patent is extended or adjusted under 35 U.S.C. 154(b) by 301 days.

(21) Appl. No.: 11/434,742

(22) Filed: May 17, 2006

(65) Prior Publication Data

US 2006/0265466 A1 Nov. 23, 2006

(30) Foreign Application Priority Data

May 17, 2005 (JP) ............................. 2005-143397

(51) Int. Cl.
*G06F 13/38* (2006.01)
(52) U.S. Cl. ...................... 711/141; 711/143; 711/144; 711/145
(58) Field of Classification Search ................. 711/141, 711/143, 144, 145
See application file for complete search history.

(56) References Cited

U.S. PATENT DOCUMENTS 6,298,418 B1  10/2001  Fujiwara et al.
6,950,908 B2 *  9/2005  Shibayama et al. ......... 711/144

OTHER PUBLICATIONS

"A Low-Overhead Coherence Solution For Multiprocessors with Private Cache Memories" by M. Pamarcos, et al. pp. 284-290., IEEE, 1984.

* cited by examiner

*Primary Examiner*—Sanjiv Shah
*Assistant Examiner*—Jae U Yu
(74) *Attorney, Agent, or Firm*—Mattingly, Stanger, Malur & Brundidge, PC

(57) ABSTRACT

In a shared memory multiprocessor system, data reading accesses and data write-back completion notifications are selected in synchronism with all of the nodes to order them. In each of the nodes, a subject address of ordered data reading access is compared with a subject address of ordered data write-back completion notification to detect a data reading operation of the same address which is passed by the completion of the data writing-back operation. Both a data reading sequence and a data writing-back sequence are determined. At this time, such a coherency response for prompting a re-reading operation of the data is transmitted to the node which transmitted the data reading access, so that coherency of the data is maintained.

5 Claims, 13 Drawing Sheets

SHARED MEMORY MULTIPROCESSOR SYSTEM

INCORPORATION BY REFERENCE

The present application claims priority from Japanese application JP2005-143397 filed on May 17, 2005, the content of which is hereby incorporated by reference into this application.

BACKGROUND OF THE INVENTION

The present invention relates to a technical idea capable of being effectively applied to a tightly-coupled multiprocessor system which shares a main memory, and a coherency control technique of data of the tightly-coupled multiprocessor system.

In a tightly-coupled multiprocessor system in which a plurality of processors each having cache memories share a main memory, data at the same address on the main memory are present in the cache memories of the plural processors in a distributed manner. At this time, in such a multiprocessor system that when data of other main memory addresses allocated to the same cache line are read, updated data are written back to the main memory, the data distributed to the cache memories on the plural processors are individually updated, and therefore, there are some possibilities that these individually updated data are different from the address of the same addresses on the main memory. As a consequence, in the case that a data reading access is issued from an arbitrary processor to the main memory, it is necessarily require to assure time sequential coherency as to the data stored in the cache memories on the respective processors and the data stored in the main memory.

Conventionally, as coherency control methods of data in such a tightly-coupled multiprocessor system in which a plurality of processors each having cache memories share a main memory, the technical ideas are known and described in, for instance, M. S. Papamarcos and J. H. Patel, "A Low-overhead Coherence Solution for Multiprocessors with Private Cache Memories," Proc. the 11th International Symposium on Computer Architecture, 1984, pp. 284-290. In the conventional coherency control methods, cache states of data are managed by the following 4 items: (1) Invalid (data of subject cache memory is invalid); (2) Shared-Unmodified (same data as that of main memory is also present in cache memory provided in another processor); (3) Exclusive-Unmodified (same data as that of main memory is present only in subject cache memory); and (4) Exclusive-Modified (updated data is present only in subject cache memory). A data reading access issued from a processor is broadcasted to all of nodes in order that a judgement is made as to whether the latest data is present in a cache memory, or the main memory by confirming data cache states of the cache memories on the processors provided in all of the nodes which constructs the tightly-coupled multiprocessor system. Also, when data of a cache line is updated, in such a case that data of another main memory address allocated to the same cache line is read, a data write-back access is issued from the processor and thus the updated data is transferred to the main memory.

At this time, the conventional technique owns such a problem that a contradiction occurs in coherency of data, since a data reading access issued from a processor and a data write-back access issued from another node passes each other on the tightly-coupled multiprocessor system.

As one solution of the above-problem, there is such a method capable of preventing an occurrence of passing each other. That is, a confirmation is made as to whether or not the data reading access directed to the same address has been issued before the data write-back access is issued on the tightly-coupled multiprocessor system, and when such an access has been issued, the write-back data is transmitted to the processor which issues the data reading access, and the data is written back to the main memory. However, this first solution owns another technical problem that the system performance is deteriorated. As a second solution of the above-explained problem, U.S. Pat. No. 6,298,418B1 has proposed such a tightly-coupled multiprocessor system equipped with a means for notifying a completion of an issued data write-back access to a main memory. Since the means for notifying the completion of the data write-back access is employed, the node which issued the data write-back access can correctly recognize the timing at which the updating operation of the main memory data is assured. In the second solution, the occurrence of the deviation between the data reading access and the data write-back access is allowed between the nodes, and it is possible to avoid the deterioration of the system performance.

In the above-described second solution, since the orders of the data reading accesses and the data write-back accesses which are transferred to the same node are not replaced with each other, the data reading access and the data write-back access cannot be carried out in accordance with processing conditions in the respective nodes. At this time, the data reading access to the main memory normally requires lengthy time. If the above-explained item is solved and the data reading access to the main memory can be carried out in an advance manner, then the system performance may be greatly improved.

SUMMARY OF THE INVENTION

An object of the present invention is to provide a shared memory multiprocessor system and a coherency control method, capable of maintaining coherency of data, while allowing deviation occurred by that a data reading access and a data write-back access are carried out in accordance with processing conditions in each of nodes.

Concrete purposes in order to achieve the above-explained object of the present invention are described as follows:

first purpose of the present invention is given by that not only data reading accesses are selected in synchronism with all of nodes so as to order the selected data reading accesses, but also data write-back completion notification is selected in synchronism with all of the nodes so as to order the selected data write-back completion notification, so that a data reading sequence and a data write-back completion sequence monitored in all of the nodes is made coherent.

A second purpose of the present invention is given by that a subject address of ordered data reading access is compared with a subject address of ordered data write-back completion notification so as to detect a data reading operation of the same address which is passed by the completion of the data writing-back operation. As a result, a sequence between a data reading operation and a data writing-back operation is determined.

A third purpose of the present invention is given by that such a coherency response for prompting a re-reading operation of the data is transmitted to the node which transmitted the data reading access having the same address, which has been passed by the completion of the data writing-back operation, so that coherency of the data is maintained.

The first purpose of the present invention can be achieved by employing a unit for broadcasting not only a data reading access, but also data write-back completion notification to all of nodes; and furthermore, a unit for selecting a received data reading access and received data write-back completion notification respectively in synchronism with all of nodes in each of these nodes.

The second purpose of the present invention can be achieved by employing a unit for comparing a subject address of ordered data reading access with a subject address of ordered data write-back completion notification; and further, a unit for adding the comparison result to a data reading access in each of the nodes.

The third purpose of the present invention can be solved by employing a unit for transmitting a coherency response for prompting a re-reading operation of data to such a node that transmitted the data reading access to which the comparison result is added; and further, a unit for receiving the coherency response which prompts the data re-reading operation and for transmitting a data re-reading access.

The data write-back completion notification is broadcasted to all of the nodes, the data write-back completion notification is ordered, and thereafter, the orders as to the data reading operations and the data writing-back operations are determined. As a result, it is possible to detect such a deviation which is produced by performing the data reading operation and the data writing-back operation in accordance with the processing condition in the node. As a consequence, since the data reading access to the main memory is carried out in the advance manner, the system performance can be improved.

In accordance with a shared memory multiprocessor of the present invention, such an effect can be achieved. That is while allowing such a deviation which is produced by performing the data reading operation and the data writing-back operation in accordance with the processing condition in each of the nodes, the coherency of the data can be maintained.

In accordance with the shared main memory multiprocessor of the present invention, in each of the nodes, the data reading access and the data write-back access can be carried out in accordance with the process condition. As a result, there is a merit that since the data reading access to the main memory can be performed in the advance manner, the system performance can be improved.

Other objects, features and advantages of the invention will become apparent from the following description of the embodiments of the invention taken in conjunction with the accompanying drawings.

DESCRIPTION OF THE EMBODIMENTS

A shared memory multiprocessor system of the present invention will now be explained in detail with reference to embodiment modes shown in drawings.

Figure 1:
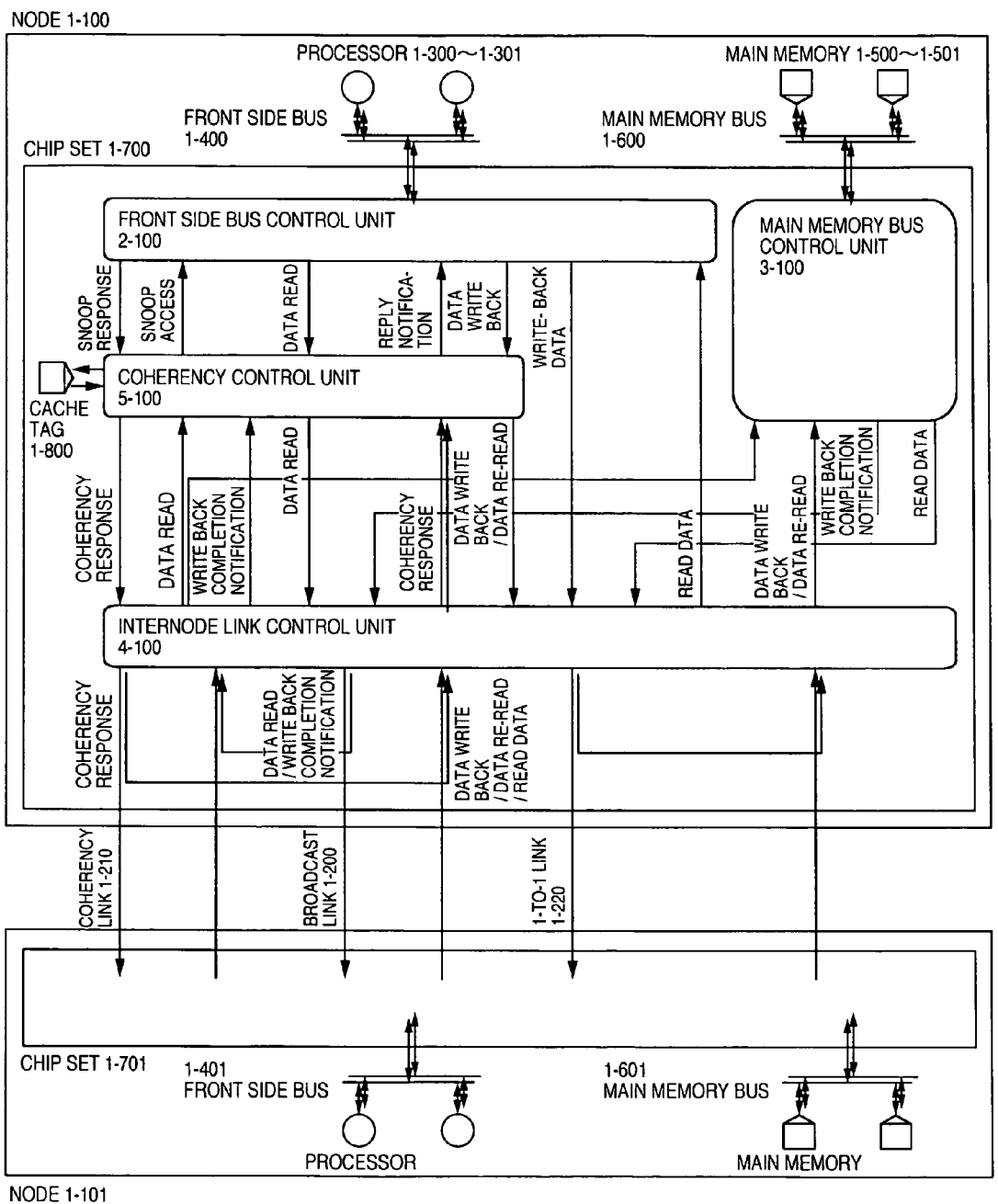
FIG. 1 is a diagram for schematically showing an arrangement of a shared memory multiprocessor system according to an embodiment of the present invention.

FIG. 1 shows a schematic arrangement of the shared memory multiprocessor system according to an embodiment of the present invention.

A node 1-100 to a node 1-101 transmit/receive data via internode links 1-200 to 1-220 among the nodes. An internode link supposed in this embodiment is arranged by a broadcast link 1-200, a coherency link 1-210, and a one-to-one link 1-220. The broadcast link 1-200 broadcasts data reading access and data write-back completion notification to all nodes. The coherency link 1-210 transmits a coherency response to a subject node. The one-to-one link 1-220 transmits a data write-back access, a data re-read access, and read data to a subject node.

The node 1-100 is constituted by processors 1-300 to 1-301 which are equipped with cache memories, a front side bus 1-400, main memories 1-500 to 1-501, a main memory bus 1-600, and a chip set 1-700. Since the node 1-101 owns the same structure as that of the node 1-100, explanations thereof are omitted. Also, although the embodiment exemplifies such an example that a node is equipped with 2 pieces of processors and 2 pieces of main memories, a total number of these processors and a total number of these main memories are not limited only to two pieces. Also, a total number of these nodes is not limited only to 2 pieces.

The chip set 1-700 is arranged by a front side bus control unit 2-100, a main memory bus control unit 3-100, an internode link control unit 4-100, and a coherency control unit 5-100. The front side bus control unit 2-100 transmits and receives data between a processor and the chip set via the front side bus 1-400. The main memory bus control unit 3-100 transmits and receives data via the main memory bus 1-600 with respect to a main memory. The internode link control unit 4-100 transmits and receives data via the internode links 1-200 to 1-220 with respect to another node. The coherency control unit 5-100 maintains coherency of data of a data reading access and a data writing-back access with reference to a cache tag 1-800 which holds data cache statuses of cache memories of the processors 1-300 to 1-301.

Figure 2:
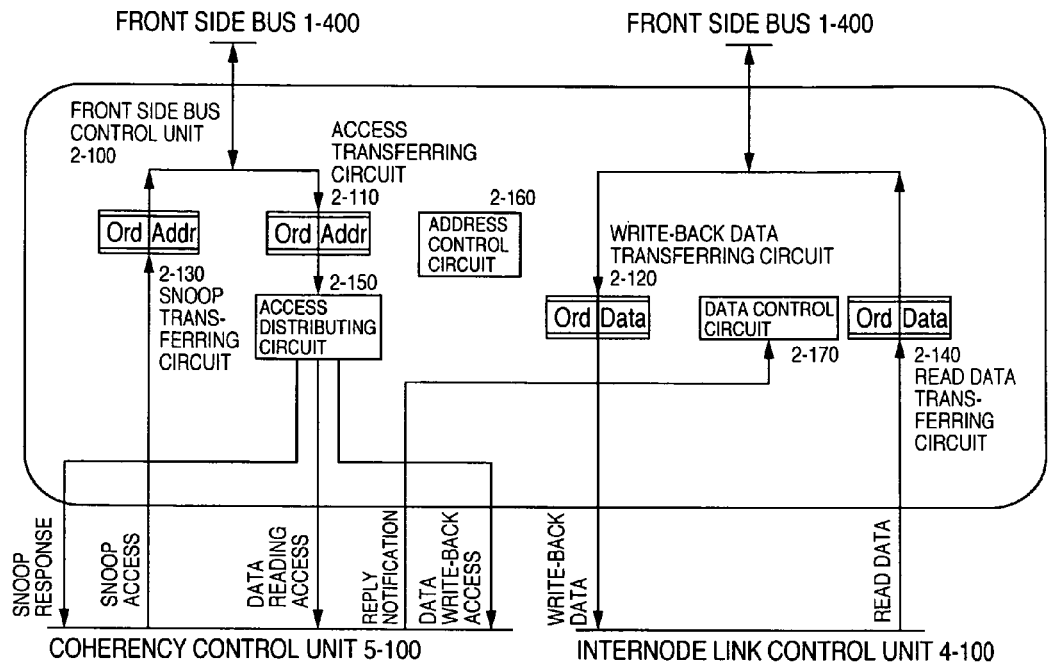
FIG. 2 is a diagram for showing an arrangement of a front side bus control unit provided by a chip set, according to the embodiment of the present invention.

FIG. 2 indicates an arrangement of the front side bus control unit 2-100.

The front side bus control unit 2-100 is arranged by a main memory access transferring circuit 2-110, a write-back data transferring circuit 2-120, a cache snoop access transferring circuit 2-130, a reading data transferring circuit 2-140, a main memory access distributing circuit 2-150, an address access control circuit 2-160, and also, a data access control circuit 2-170. The main memory access transferring circuit 2-110 receives and holds a data reading access, a data write-back access, and a cache snoop response, which are transmitted to the coherency control unit 5-100, from the processors 1-300 to 1-301 via the front side bus 1-400. The write-back data transferring circuit 2-120 receives and holds write-back data which is transmitted to the internode link control unit 4-100 from the processors 1-300 to 1-301 via the front side bus 1-400.

The cache snoop access transferring circuit 2-130 receives and holds a cache snoop access from the coherency control unit 5-100, which is transmitted to the processors 1-300 to 1-301 via the front side bus 1-400. The reading data transferring circuit 2-140 receives and holds reading data from the internode link control unit, which is transmitted to the processors 1-300 to 1-301 via the front side bus 1-400. The main memory access distributing circuit 2-150 distributes a data reading access, a data writing access, and a cache snoop response to individual signal lines, which are transmitted from the main memory access transferring circuit 2-110 to the coherency control unit 5-100. The address access control circuit 2-160 controls as to whether or not a main memory access is received from the processors 1-300 to 1-301, or controls as to whether or not a cache snoop access is transmitted to the processors 1-300 to 1-301. The data access control circuit 2-170 controls as to whether or not write-back data in connection with a data write-back access is received from the processors 1-300 to 1-301, or controls as to whether or not reading data for a data reading access is transmitted to the processors 1-300 to 1-301 in response to data reply notification received by the coherency control unit 5-100.

Figure 3:
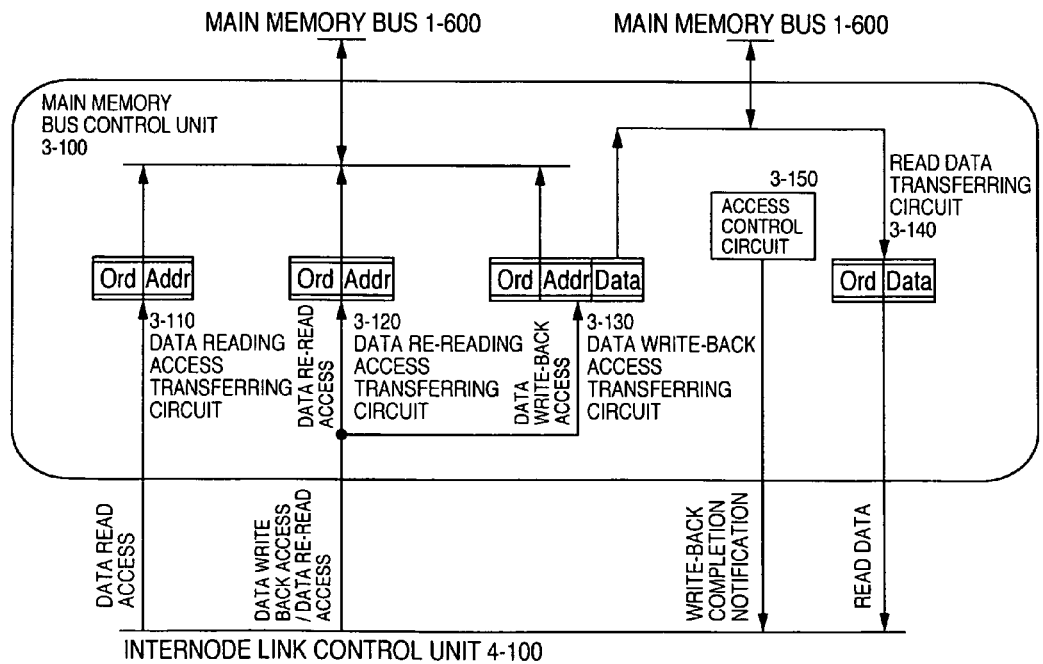
FIG. 3 is a diagram for indicating an arrangement of a main memory bus control unit provided by the chip set, according to the embodiment of the present invention.

FIG. 3 shows an arrangement of the main memory bus control unit 3-100.

The main memory bus control unit 3-100 is constituted by a data reading access transferring circuit 3-110, a data re-reading access transferring circuit 3-120, a data write-back access transferring circuit 3-130, a reading data transferring circuit 3-140, and a main memory access control circuit 3-150. The data reading access transferring circuit 3-110 receives and holds a data reading access from the internode link control unit 4-100, which is transmitted via the main memory bus 1-600 to the main memories 1-500 to 1-501. The data re-reading access transferring circuit 3-120 receives and holds a data re-reading access from the internode link control unit 4-100, which is transmitted via the main memory bus 1-600 to the main memories 1-500 to 1-501. The data write-back access transferring circuit 3-130 receives and holds a data write-back access from the internode link control unit 4-100, which is transmitted via the main memory bus 1-600 to the main memories 1-500 to 1-501. The reading data transferring circuit 3-140 receives and holds either reading data with respect to the data reading access or reading data with respect to the data re-reading access from the main memories 1-500 to 1-501 via the main memory bus 1-600, which is transmitted to the internode control unit 4-100. The main memory access control circuit 3-150 controls that any one of the data reading access, the data re-reading access, and the data write-back access to the main memories 1-500 to 1-501, and in the case that either the data reading access or the data re-reading access is transmitted to the main memories 1-500 to 1-501, the main memory access control circuit 3-150 reads the reading data which is received from the main memories 1-500 to 1-501 and causes the reading data transferring circuit 3-140 to hold this reading data. Furthermore, in the case that the data write-back access is transmitted to the main memories 1-500 to 1-501, the main memory access control circuit 3-150 transmits data write-back completion notification to the internode link control unit 4-100.

Figure 4:
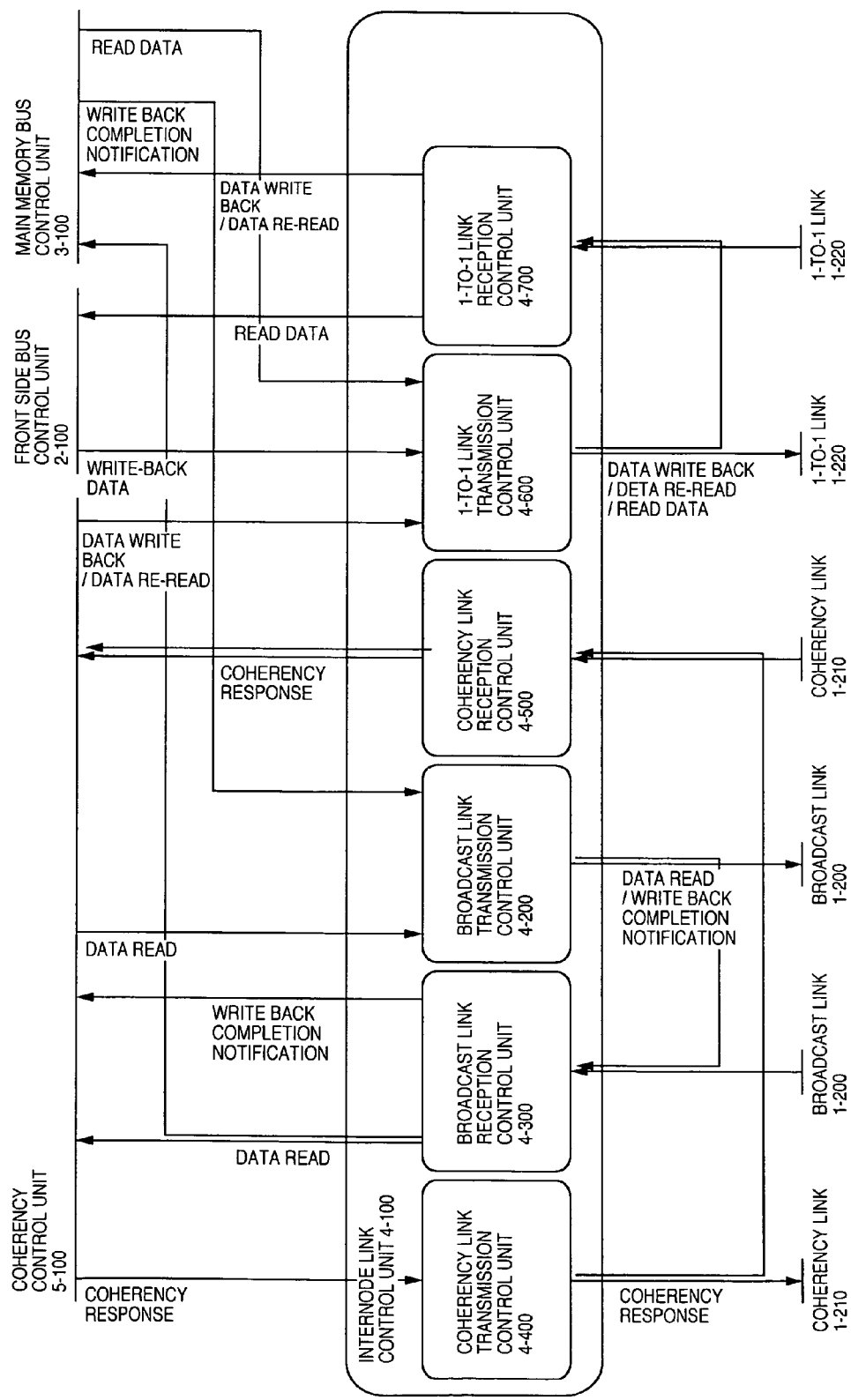
FIG. 4 is a diagram for representing an arrangement of an internode link control unit provided by the chip set, according to the embodiment of the present invention.

FIG. 4 indicates an arrangement of the internode link control unit 4-100. The internode link control unit 4-100 is constituted by a broadcast link transmission control unit 4-200, a broadcast link reception control unit 4-300, a coherency link transmission control unit 4-400, a coherency link reception control unit 4-500, and a one-to-one link transmission control unit 4-600, and a one-to-one link reception control unit 4-700.

Figure 5:
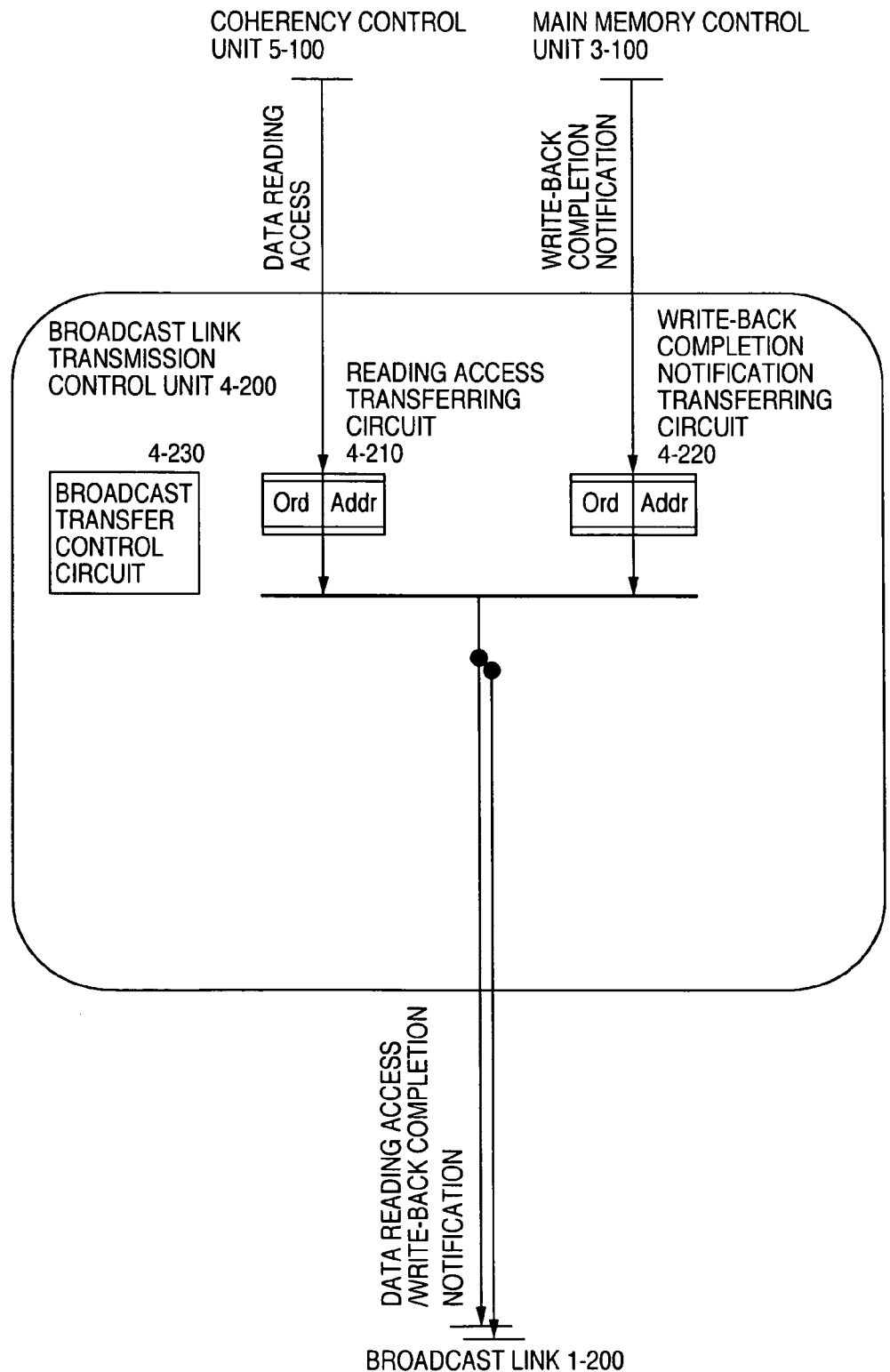
FIG. 5 is a diagram for showing an arrangement of a broadcast link transmission control unit of the internode link control unit, according to the embodiment of the present invention.

FIG. 5 shows an arrangement of the broadcast link transmission control unit 4-200. The broadcast link transmission control unit 4-200 is constituted by a data reading access transferring circuit 4-210, a data write-back completion notification transferring circuit 4-220, and a broadcast transfer control circuit 4-230. The data reading access transferring circuit 4-210 receives and holds a data reading access from the coherency control unit 5-100, which is transmitted via the broadcast link 1-200 to all of the nodes 1-100 to 1-101. The data write-back completion notification transferring circuit 4-220 receives and holds data write-back completion notification from the main memory bus control unit 3-100, which is transmitted via the broadcast link 1-200 to all of the nodes 1-100 to 1-101. The broadcast transfer control circuit 4-230 controls that any one of the data reading access and the data write-back completion notification is transmitted to all of the nodes 1-100 to 1-101.

In the present invention, the broadcast transfer control circuit 4-230 is novel, which controls that the data write-back completion notification is transmitted via the broadcast link 1-200 to all of the nodes 1-100 to 1-101.

Figure 6:
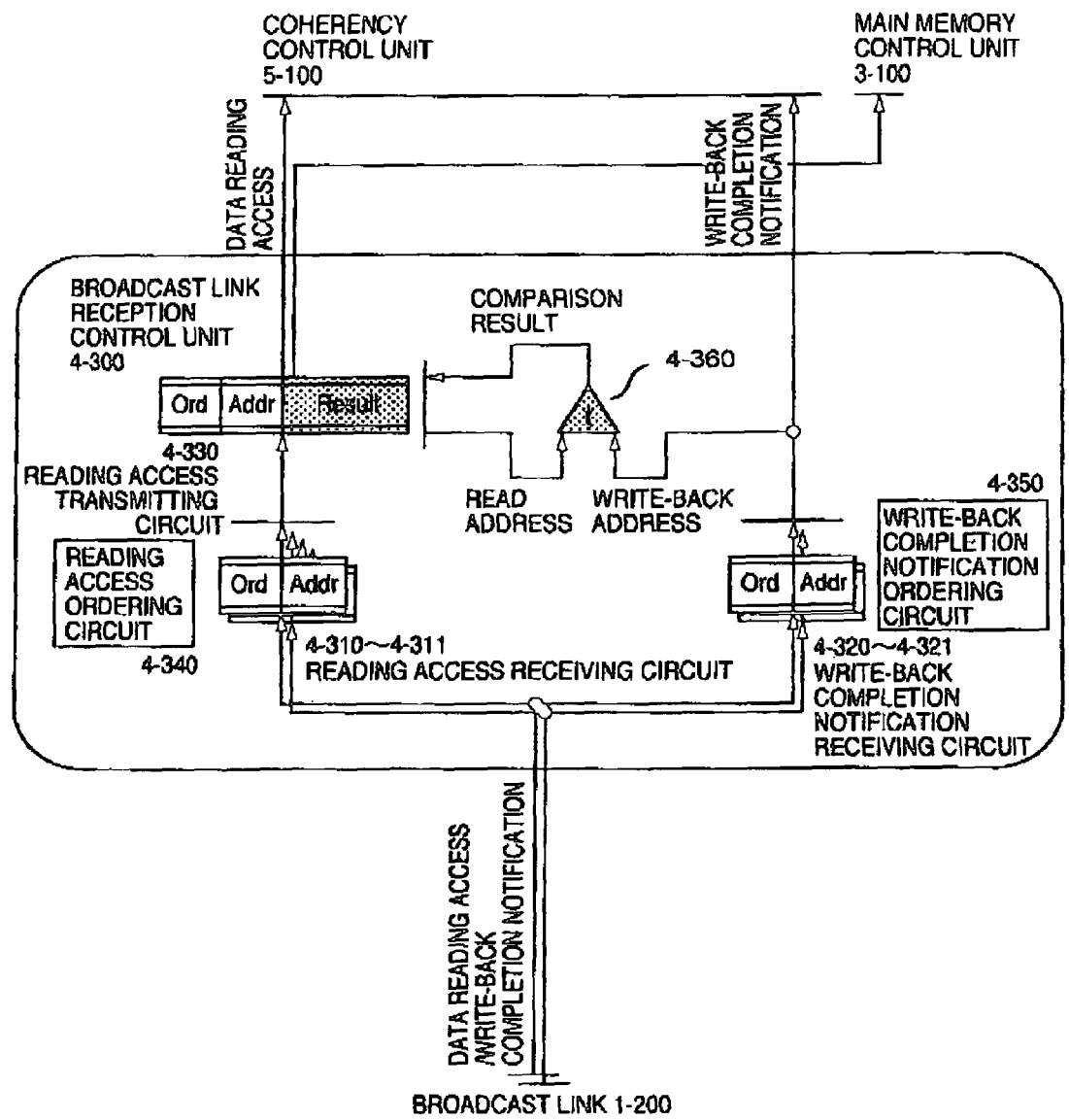
FIG. 6 is a diagram for showing an arrangement of a broadcast link reception control unit of the internode link control unit, according to the embodiment of the present invention.

FIG. 6 indicates an arrangement of the broadcast link reception control unit 4-300. The broadcast link reception control unit 4-300 is arranged by data reading access receiving circuits 4-310 to 4-311, data write-back completion notification receiving circuits 4-320 to 4-321, a data reading access transmitting circuit 4-330, a data reading access ordering circuit 4-340, a data write-back completion notification ordering circuit 4-350, and a data reading/data write-back passing detecting circuit 4-360. The data reading access receiving circuits 4-310 to 4-311 receives and holds a data reading access from the respective nodes 1-100 to 1-101 via the broadcast link 1-200. The data write-back completion notification receiving circuits 4-320 to 4-321 receives and holds data write-back completion notification from the respective nodes 1-100 to 1-101 via the broadcast link 1-200. The data reading access transmitting circuit 4-330 receives and holds ordered data reading accesses which are transmitted to the coherency control unit 5-100 and the main memory bus control unit 3-100. The data reading access ordering circuit 4-340 selects that a data reading access received from which one of these nodes 1-100 to 1-101 is transmitted to the coherency control unit 5-100 and the main memory bus control unit 3-100 in synchronism with all of the nodes 1-100 to 1-101, and orders the selected data reading accesses. The data write-back completion notification ordering circuit 4-350 selects that data write-back completion notification received from which one of these nodes 1-100 to 1-101 is transmitted to the coherency control unit 5-100 and the main memory bus control unit 3-100 in synchronism with all of the nodes 1-100 to 1-101, and orders the selected data write-back completion notification. The data reading/data write-back passing detecting circuit 4-360 compares a subject address of the ordered data reading access held by the data reading access transmitting circuit 4-330 with a subject address of the ordered data write-back access, and then, adds the comparison result to the ordered data reading access.

The present invention is characterized by newly employing the data write-back completion notification ordering circuit 4-350 by which the data write-back completion notification received from the respective nodes 1-100 to 1-101 is selected in synchronism with all of the nodes 1-100 to 1-101 so as to be monitored by all of these nodes 1-100 to 1-101. Also, the data reading/data write-back passing detecting circuit 4-360 is novel, by which the subject address of the ordered data reading access is compared with the subject address of the ordered data write-back completion notification so as to detect the data reading operation on the same address, through which the data write-back completion passes.

Figure 7:
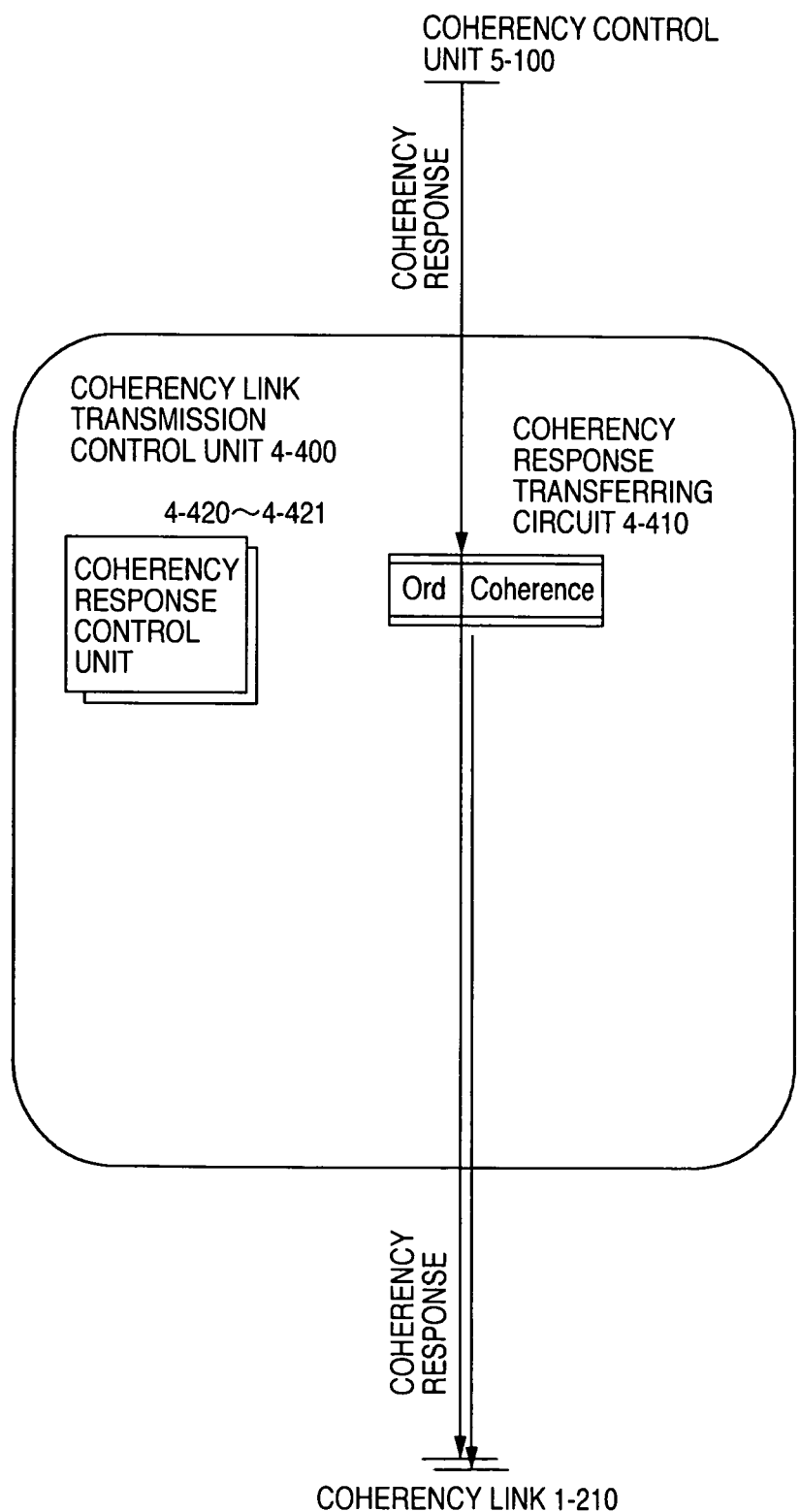
FIG. 7 is a diagram for indicating an arrangement of a coherency link transmission control unit of the internode link control unit, according to the embodiment of the present invention.

FIG. 7 shows an arrangement of the coherency link transmission control unit 4-400. The coherency link transmission control unit 4-400 is arranged by a coherency response transferring circuit 4-410 and coherency response control circuits 4-420 to 4-421. The coherency response transferring circuit 4-410 receives and holds a coherency response from the coherency control unit 5-100, which is transmitted via the coherency link 1-210 to the subject nodes 1-100 to 1-101. The coherency response control circuits 4-420 to 4-421 transmit the coherency responses to the subject nodes 1-100 to 1-101.

Figure 8:
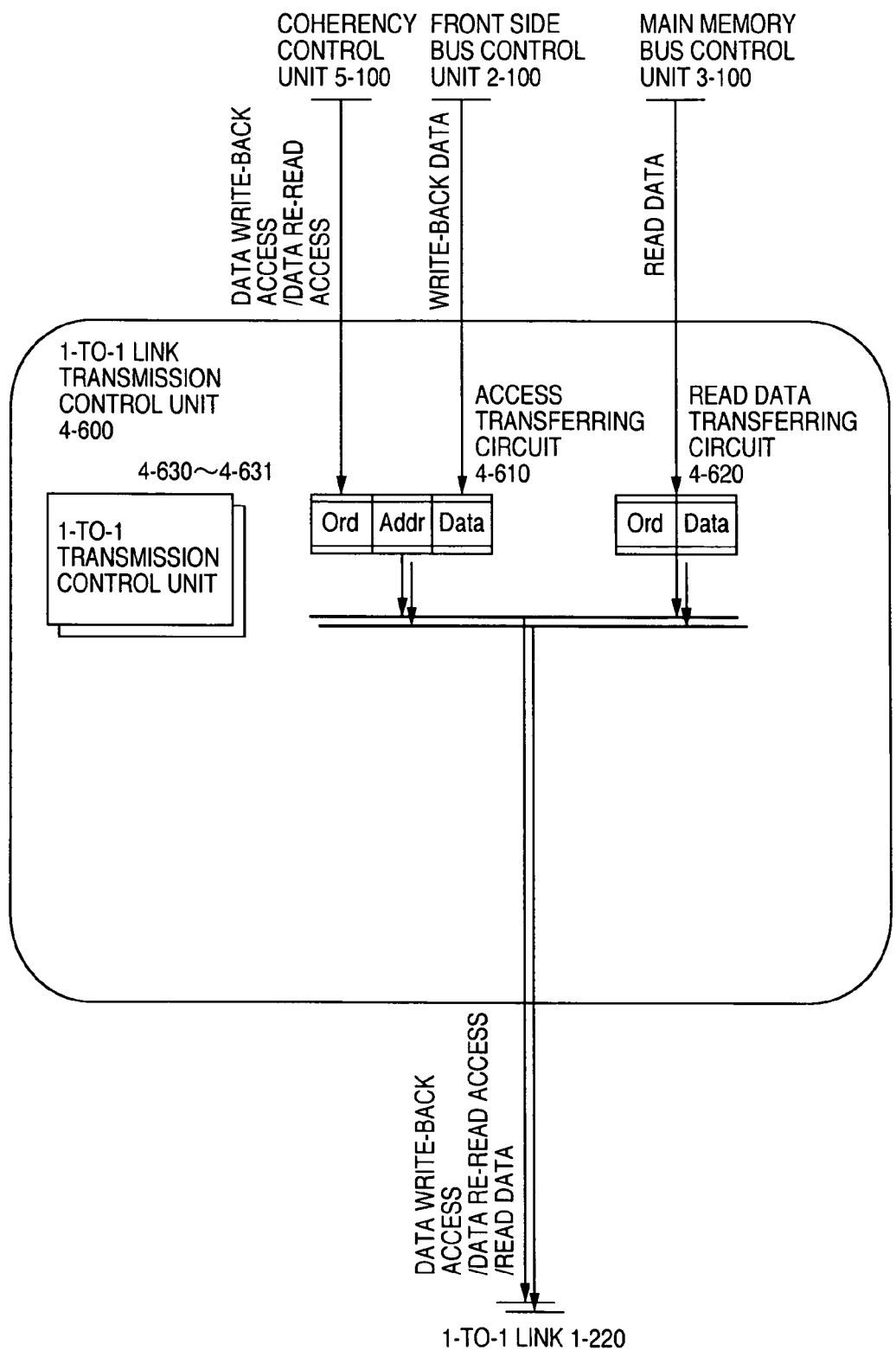
FIG. 8 is a diagram for representing an arrangement of a one-to-one link transmission control unit of the internode link control unit, according to the embodiment of the present invention.

FIG. 8 represents an arrangement of the one-to-one link transmission control unit 4-600 is constituted by a main memory access transferring circuit 4-610, a reading data transferring circuit 4-620, and one-to-one transfer control circuits 4-630 to 4-631. The main memory access transferring circuit 4-610 receives either a data re-reading access or a data write-back access, which is transmitted via the one-to-one link 1-220 to the subject nodes 1-100 to 1-101, and receives/holds write-back data from the front side bus control unit 2-100. The reading data transferring circuit 4-620 receives and holds the read data from the main memory bus control unit 3-100, which is transmitted via the one-to-one link 1-220 to the subject nodes 1-100 to 1-101. The one-to-one transfer control circuits 4-630 to 4-631 control that either a main memory access or reading data to the subject nodes 1-100 to 1-101.

Figure 9:
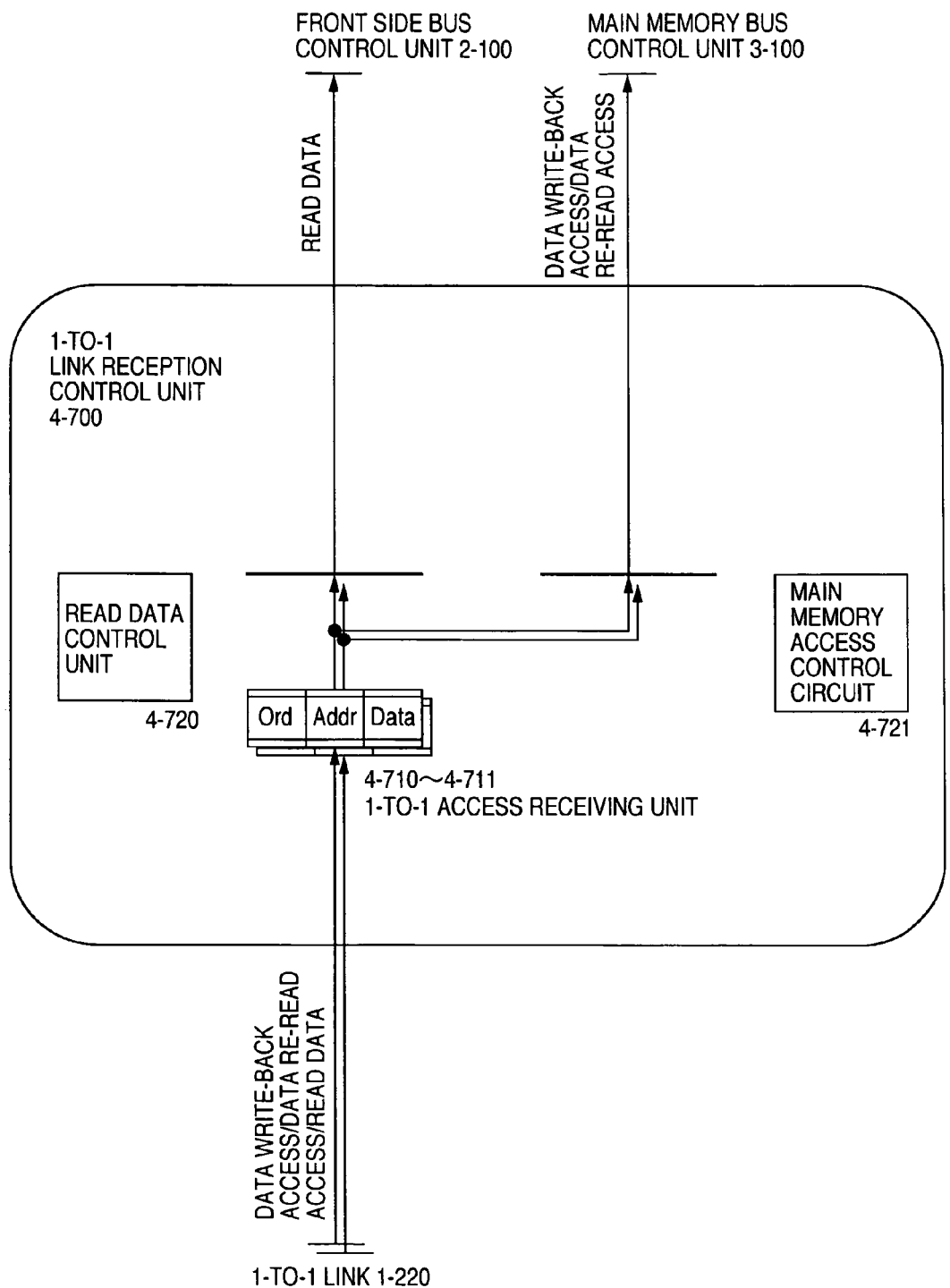
FIG. 9 is a diagram for representing an arrangement of a one-to-one link reception control unit of the internode link control unit, according to the embodiment of the present invention.

FIG. 9 shows an arrangement of the one-to-one link reception control unit 4-700. The one-to-one link reception control unit 4-700 is arranged by one-to-one access receiving circuits 4-700 to 4-711; a reading data control circuit 4-720; and a main memory access control circuit 4-721. The one-to-one access receiving circuits 4-710 to 4-711 receive and hold reading data, a data re-reading access, and a data write-back access from the respective nodes 1-100 to 1-101 via the one-to-one link 1-220. The reading data control circuit 4-720 controls that reading data received from which one of these nodes 1-100 to 1-101 is transmitted to the front side bus control unit 2-100. Also, the main memory access control circuit 4-721 controls that either a data re-reading access or a data write-back access received from which one of these nodes 1-100 to 1-101 is transmitted to the main memory bus control unit 3-100.

Figure 10:
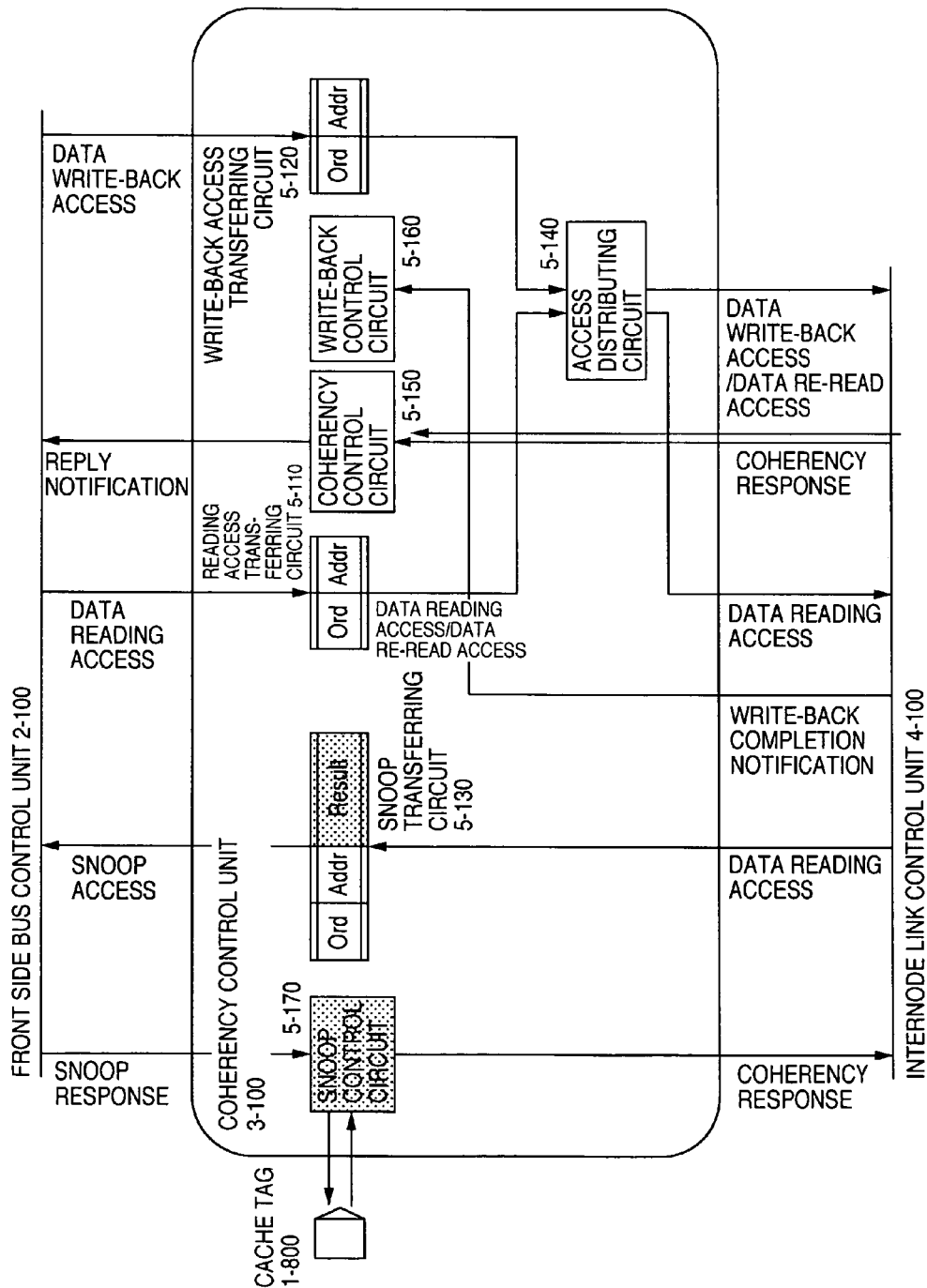
FIG. 10 is a diagram for indicating an arrangement of a coherency control unit provided by the chip set, according to the embodiment of the present invention.

FIG. 10 indicates an arrangement of the coherency control unit 5-100. The coherency control unit 5-100 is arranged by a data reading access transferring circuit 5-110, a data write-back access transferring circuit 5-120, a cache snoop access transferring circuit 5-130, a main memory access distributing circuit 5-140, a coherency control circuit 5-150, a data write-back access control circuit 5-160, and a cache snoop access control circuit 5-170. The data reading access transferring circuit 5-110 receives and holds both a data reading access from the front side bus control unit 2-100 and a data re-reading access, which are transmitted to the internode link control unit 4-100. The data write-back access transferring circuit 5-120 receives and holds a data write-back access from the front side bus control unit 2-100, which is transmitted to the internode link control unit 4-100. The cache snoop access transferring circuit 5-130 receives and holds a data reading access from the internode link control unit 4-100, with respect to a cache snoop access which is transmitted to the front side bus control unit 2-100. The main memory access distributing circuit 5-140 distributes data reading accesses to the individual signal lines, which are transmitted from the data reading access transferring circuit 5-110 and the data write-back transferring circuit 5-120 to the internode link control unit 4-100, and also, distributes both a data re-reading access and a data write-back access to the same signal line. The coherency control circuit 5-150 receives a coherency response with respect to a data reading access from the internode link control unit 4-100 in order to judge as to whether or not coherency of reading data is maintained which is transmitted from the internode link control unit 4-100 to the front side bus control unit 2-100, and transmits data reply notification to the front side bus control unit 2-100. Also, in such a case that a coherency response with respect to a data reading access received from the internode link control unit 4-100 prompts a data re-reading operation, the coherency control circuit 5-150 transmits a data re-reading access to the internode control unit 4-100. Until the data write-back access control circuit 5-160 receives data write-back completion notification with respect to a data write-back access from the internode link control unit 4-100, the data write-back access control circuit 5-160 suppresses to transmit a main memory access with respect to the same address received from the front side bus unit 2-100 to the internode link control unit 4-100. The cache snoop control unit 5-100 refers to the cache tag 1-800 from a subject address of a data reading access received from the internode link control unit 4-100 in order to judge as to whether or not the cache memories of the processors 1-300 to 1-301 must be snooped, and then, transmits a cache snoop access to the front side bus control unit 2-100. Also, as a result of referring to the cache tag 1-800, the cache snoop control unit 5-100 transmits a coherency response to the internode link control unit 4-100, while the coherency response is used to maintain coherency of reading data from a cache snoop response received from the front side bus control unit 2-100, and the comparison result added in the internode link control unit 4-100.

The present invention is characterized by newly employing the coherency control circuit 5-150. That is, in the case that a data re-reading operation is required with respect to a data reading access, the coherency control circuit 5-150 produces a data re-reading access without requesting the processors 1-300 to 1-301 to retry via the front side bus 1-400. Also, the cache snoop access control circuit 5-170 is novel which produces a coherency response in order to maintain coherency of reading data from the comparison result added by the internode link control unit 4-100.

Next, a description is made of operation examples as to the shared memory multiprocessor system and the coherency control method of the data, according to the present embodiment.

Referring now to a time chart of FIG. 11, the following operations will be explained: That is, a data reading access directed to an address of a main memory provided in the node 1-100 is issued from a processor provided in this node 1-100, and data of the subject address is not present in both a cache memory on the processor provided by the node 1-100 and a cache memory on the processor provided by the node 1-101.

In the node 1-100, the front side bus control unit 2-100 transmits a data reading access to the coherency control unit 5-100, which is received from a processor via the front side bus 1-400. The coherency control unit 5-100 transmits a data reading access which is received from the front side bus control unit 2-100 to the internode link control unit 4-100. The internode link control unit 4-100 broadcast-transmits the data reading request from the coherency control unit 5-100 via the broadcast link 1-200 to the node 1-100 and the node 1-101.

In the node 1-100, the internode link control unit 4-100 transmits the data reading access to both the main memory bus control unit 3-100 and the coherency control unit 5-100, which is received from the node 1-100 via the broadcast link 1-200. The main memory bus control unit 3-100 transmits the data reading access received from the internode link control unit 4-100 to a main memory via the main memory bus 1-600. Thereafter, the main memory bus control unit 3-100 transmits the read data received from the main memory via the main memory bus 1-600 to the internode link control unit 4-100. The internode control unit 4-100 transmits the read data received from the main memory bus control unit 3-100 to the node 1-100 via the one-to-one link 1-220. Also, the coherency control unit 5-100 refers to a cache tag from the subject address of the data reading access received from the internode link control unit 4-100, and then, transmits such a coherency response which indicates that the data of the subject address is not present in the cache memory on the processor provided by the node 1-100 to the internode link control unit 4-100. The internode link control unit 4-100 transmits the coherency response received from the coherency control unit 5-100 via the coherency link 1-210 to the node 1-100.

On the other hand, in the node 1-101, the internode link control unit 4-101 transmits the data reading access to the coherency control unit 5-100, which is received from the node 1-100 via the broadcast link 1-200. Also, the coherency control unit 5-101 refers to a cache tag from the subject address of the data reading access received from the internode link control unit 4-101, and then, transmits such a coherency response which indicates that the data of the subject address is not present in the cache memory on the processor provided by the node 1-101 to the internode link control unit 4-101. The internode link control unit 4-101 transmits the coherency response received from the coherency control unit 5-100 via the coherency link 1-210 to the node 1-101.

In the node 1-100, the internode link control unit 4-100 transmits the read data received from the node 1-101 via the one-to-one link 1-220 to the front side bus control unit 2-100. Also, the internode link control unit 4-100 transmits the coherency response received from the node 1-100 via the coherency link 1-210 to the coherency control unit 5-100. Further, the internode link control unit 4-100 transmits the coherency response received from the node 1-101 via the coherency link 1-210 to the coherency control unit 5-100. The coherency control unit 5-100 collects the coherency response of the node 1-100 and the coherence response of the node 1-101 received from the internode link control unit 4-100, and transmits data reply notification to the front side bus control unit 2-100. The front side bus control unit 2-100 transmits the read data to the processor via the front side bus 1-400, which is received from the internode link control unit 4-100 in accordance with the data reply notification received from the coherency control unit 5-100.

Figure 11:
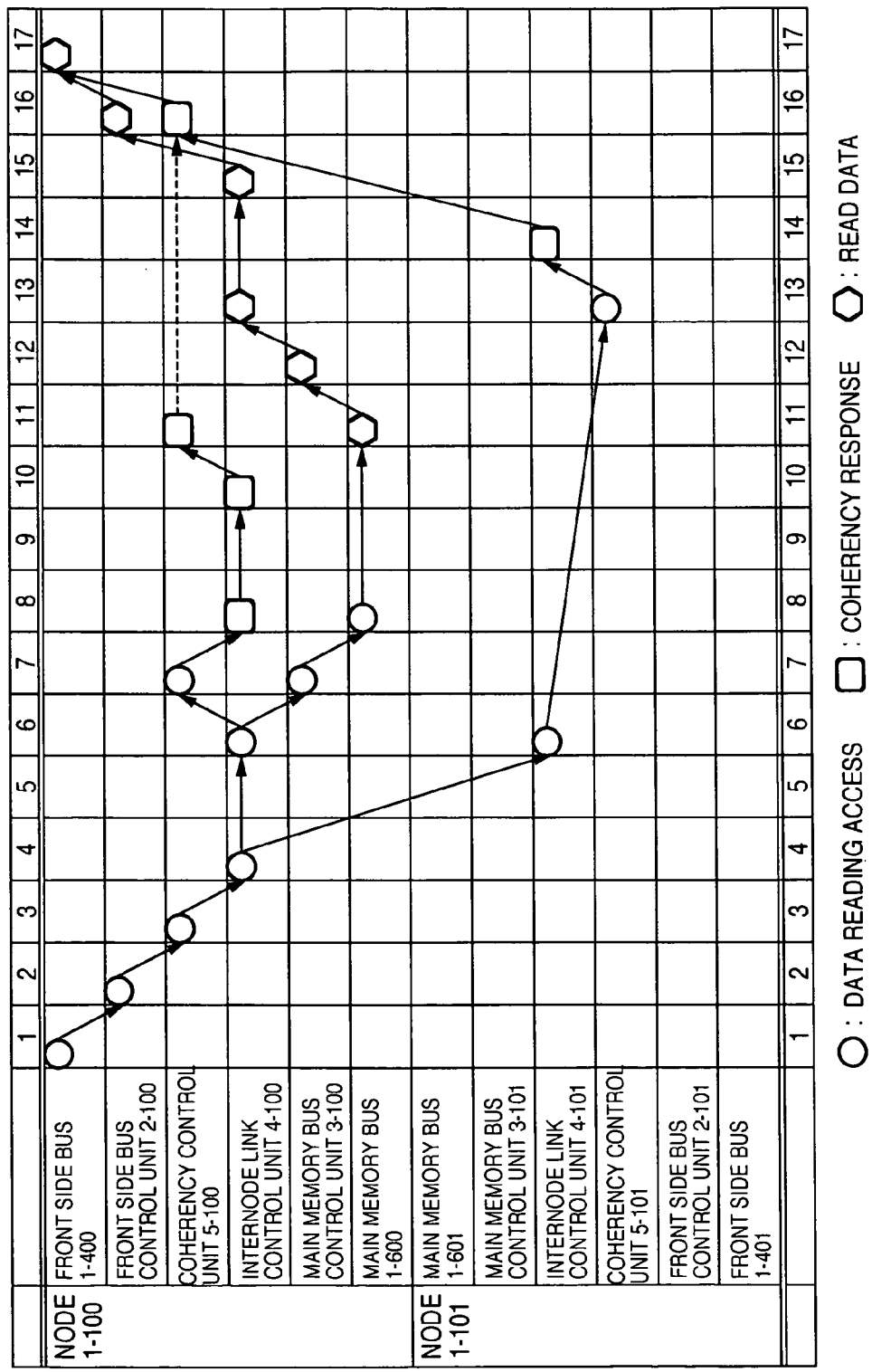
FIG. 11 is a timing chart for showing operation examples as to the shared memory multiprocessor system and a coherency control method of data, according to the embodiment of the present invention.
Figure 12:
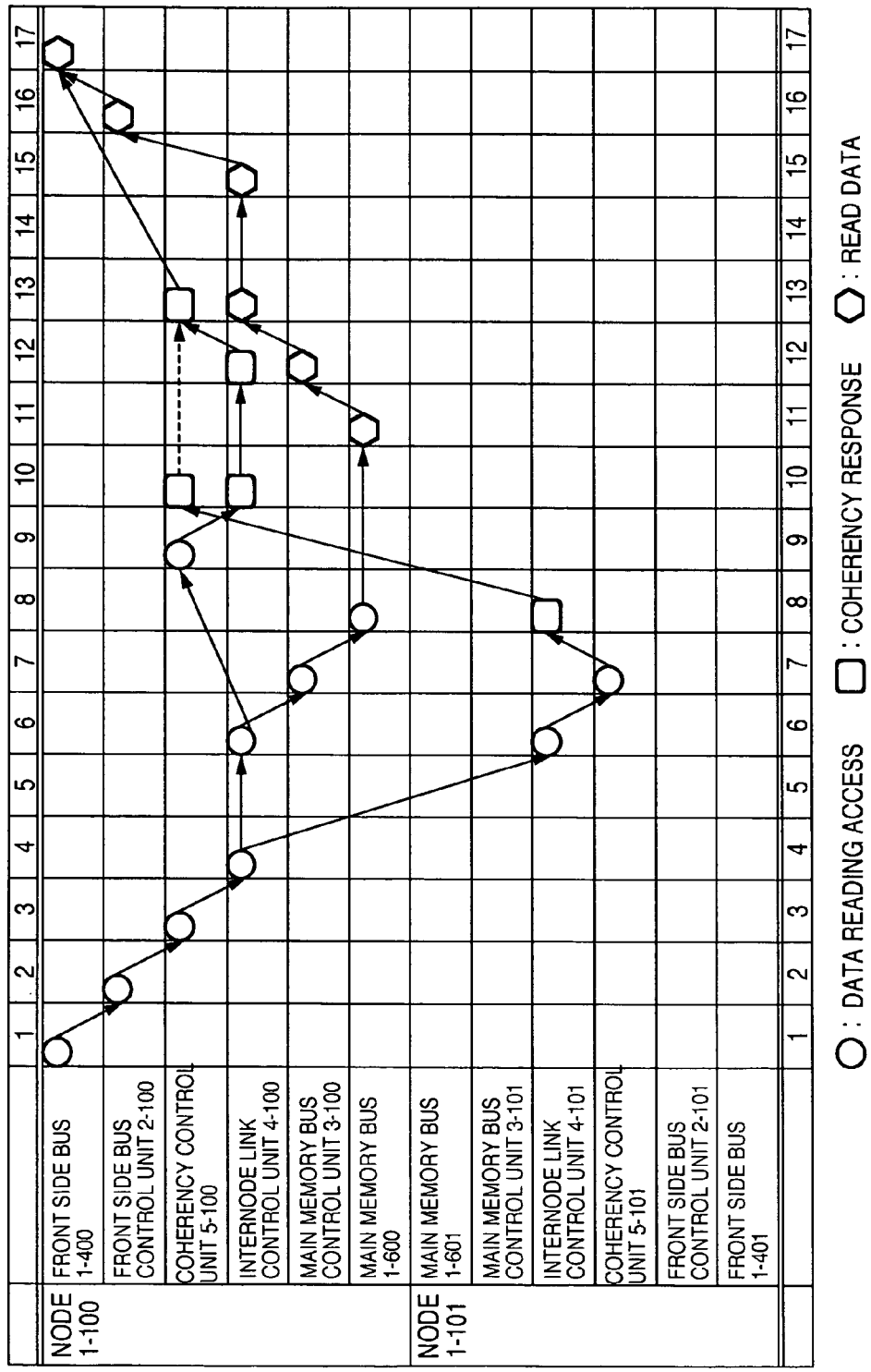
FIG. 12 is a timing chart for showing operation examples as to the shared memory multiprocessor system and a coherency control method of data, according to the embodiment of the present invention.

At this time, the time chart of FIG. 11 shows such a case that the data reading access of the node 1-101 is delayed, as compared with the data reading access of the node 1-100. Also, a time chart of FIG. 12 indicates such a case that in the node 1-100, the data reading access of the coherency control unit 5-100 is delayed, as compared with the data reading access of the main memory bus control unit 3-100. Since a data reading access to a main memory is carried out in a preceding manner, the main memory of the processor can be accessed in a high speed.

Figure 13:
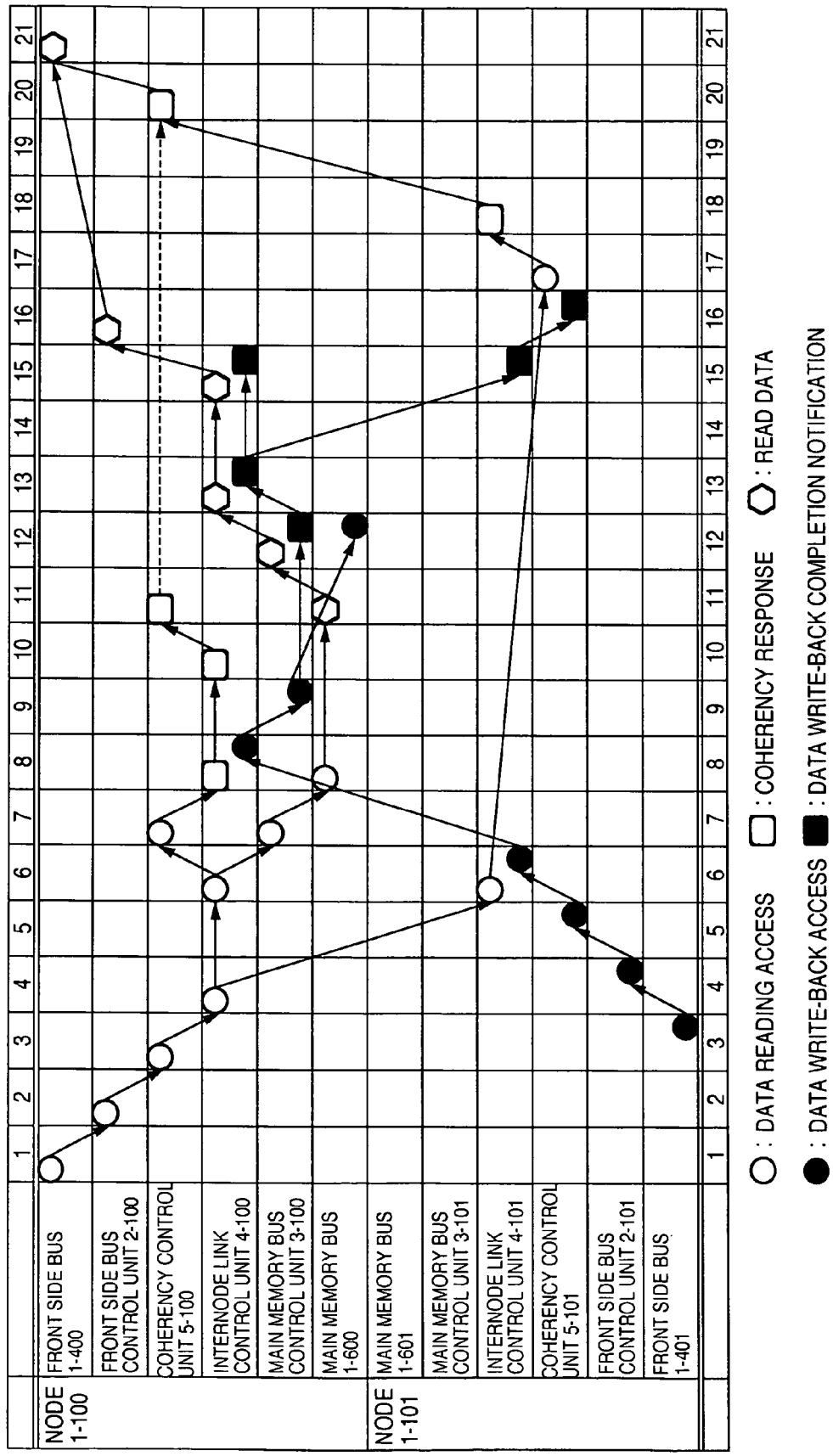
FIG. 13 is the timing chart for representing the technical problems as to the conventional shared memory multiprocessor system and the conventional coherency control method of the data.

Referring now to a time chart of FIG. 13, a description is made of operations in the following case: That is, a data reading access directed to an address of a main memory provided in the node 1-100 is issued from a processor provided in the node 1-100; although data of the subject address is not present in the cache memory on the processor provided in the node 1-100, update data of the subject address is present in the cache memory on the processor provided in the node 1-101; when a data write-back access to the main memory provided in the node 1-100 is issued from the processor provided in the node 1-101, an internode link control unit is not equipped with a circuit for detecting a data reading access which is passed by the data write-back notification.

In the node 1-100, the front side bus control unit 2-100 transmits a data reading access received from a processor via the front side bus 1-400 to the coherency control unit 5-100. The coherency control unit 5-100 transmits the data reading access received from the front side bus control unit 2-100 to the internode link control unit 4-100. The internode link control unit 4-100 broadcasts the data reading access received from the coherency control unit 5-100 to the node 1-100 and the node 1-101 via the broadcast link 1-200.

On the other hand, in the node 1-101, the front side bus control unit 2-101 transmits a data write-back access received from a processor via the front side bus 1-401 to the coherency control unit 5-101. The coherency control unit 5-101 transmits the data write-back access received from the front side bus control unit 2-101 to the internode link control unit 4-101. The internode link control unit 4-101 transmits the data write-back access received from the coherency control unit 5-101 to the node 1-100 via the one-to-one link 1-202.

In the node 1-100, the internode link control unit 4-100 transmits the data reading access to both the main memory bus control unit 3-100 and the coherency control unit 5-100, which is received from the node 1-100 via the broadcast link 1-200. Also, the internode link control unit 4-100 transmits the data write-back access to the main memory bus control unit 3-100, which is received from the node 1-101 via the one-to-one link 1-202. The main memory bus control unit 3-100 transmits the data reading access received from the internode link control unit 4-100 to a main memory via the main memory bus 1-600. Thereafter, the main memory bus control unit 3-100 transmits the read data received from the main memory via the main memory bus 1-600 to the internode link control unit 4-100. Also, the main memory bus control unit 3-100 transmits a data write-back access received from the internode link control unit 4-100 to a main memory via the main memory bus 1-600, and transmits data write-back completion notification to the internode link control unit 4-100. The internode control unit 4-100 transmits the read data received from the main memory bus control unit 3-100 to the node 1-100 via the one-to-one link 1-220. Also, the internode link control unit 4-100 broadcasts the data write-back completion notification received from the main memory bus control unit 3-100 to both the node 1-100 and the node 1-101 via the broadcast link 1-200. Also, the coherency control unit 5-100 refers to a cache tag from the subject address of the data reading access received from the internode link control unit 4-100, and then, transmits such a coherency response which indicates that the data of the subject address is not present in the cache memory on the processor provided by the node 1-100 to the internode link control unit 4-100. The internode link control unit 4-100 transmits the coherency response received from the coherency control unit 5-100 via the coherency link 1-210 to the node 1-100.

On the other hand, in the node 1-101, the internode link control unit 4-101 transmits the data write-back completion notification to the coherency control unit 5-101, which is received from the node 1-100 via the broadcast link 1-200. Also, the internode link control unit 4-101 transmits the data reading access to the coherency control unit 5-101, which is received from the node 1-100 via the broadcast link 1-200. The coherency control unit 5-101 completes the data write-back access in accordance with the data write-back completion notification received from the internode link control unit 4-101. Also, the coherency control unit 5-101 refers to a cache tag from the subject address of the data reading access received from the internode link control unit 4-101. At this time, since the data write-back access has been transmitted, the coherency control unit 5-101 transmits such a coherency response which indicates that the data of the subject address is not present in the cache memory on the processor provided by the node 1-101 to the internode link control unit 4-101. The internode link control unit 4-101 transmits the coherency response received from the coherency control unit 5-101 via the coherency link 1-210 to the node 1-101.

In the node 1-100, the internode link control unit 4-100 transmits the read data received from the node 1-101 via the front side bus control unit 2-100. Also, the internode link control unit 4-100 transmits the coherency response received from the node 1-100 via the coherency link 1-210 to the coherency control unit 5-100. Further, the internode link control unit 4-100 transmits the coherency response received from the node 1-101 via the coherency link 1-210 to the coherency control unit 5-100. The coherency control unit 5-100 collects the coherency response of the node 1-100 and the coherence response of the node 1-101 received from the internode link control unit 4-100, and transmits data reply notification to the front side bus control unit 2-100. The front side bus control unit 2-100 transmits the read data to the processor via the front side bus 1-400, which is received from the internode link control unit 4-100 in accordance with the data reply notification received from the coherency control unit 5-100. At this time, the read data transmitted to the processor corresponds to such a data which has not yet written back, so that a contradiction may occur in coherency of the data.

Figure 14:
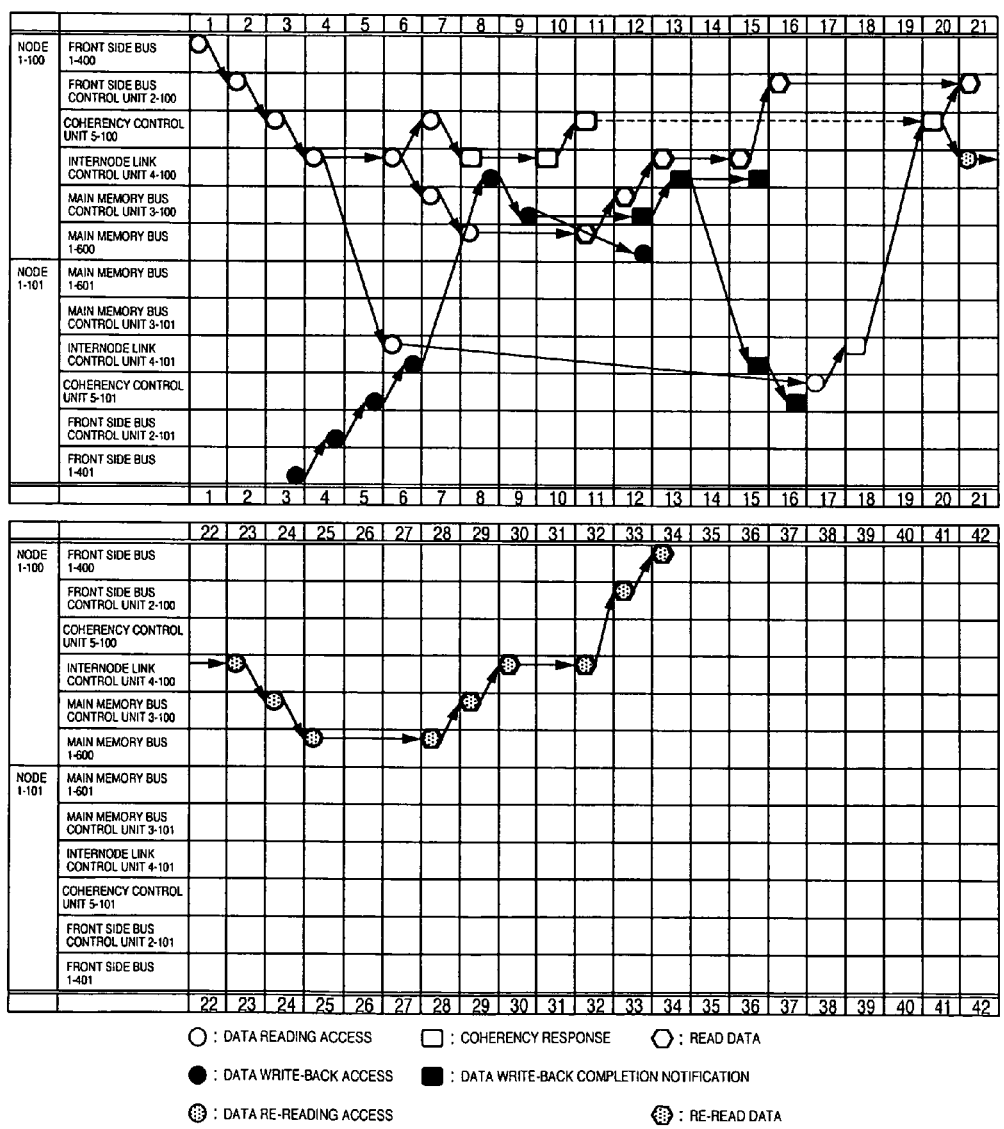
FIG. 14 is a timing chart for describing a solution of the technical problem according to the shared memory multiprocessor system and the coherency control method of the data, according to the embodiment of the present invention.

Referring now to a time chart of FIG. 14, a description is made of operations in the following case: That is, a data reading access directed to an address of a main memory provided in the node 1-100 is issued from a processor provided in the node 1-100; although data of the subject address is not present in the cache memory on the processor provided in the node 1-100, update data of the subject address is present in the cache memory on the processor provided in the node 1-101; when a data write-back access to the main memory provided in the node 1-100 is issued from the processor provided in the node 1-101, an internode link control unit is equipped with a circuit for detecting a data reading access which is passed by the data write-back notification.

In the node 1-100, the front side bus control unit 2-100 transmits a data reading access received from a processor via the front side bus 1-400 to the coherency control unit 5-100. The coherency control unit 5-100 transmits the data reading access received from the front side bus control unit 2-100 to the internode link control unit 4-100. The internode link control unit 4-100 broadcasts the data reading access received from the coherency control unit 5-100 to the node 1-100 and the node 1-101 via the broadcast link 1-200.

On the other hand, in the node 1-101, the front side bus control unit 2-101 transmits a data write-back access received from a processor via the front side bus 1-401 to the coherency control unit 5-101. The coherency control unit 5-101 transmits the data write-back access received from the front side bus control unit 2-101 to the internode link control unit 4-101. The internode link control unit 4-101 transmits the data write-back access received from the coherency control unit 5-101 to the node 1-100 via the one-to-one link 1-202.

In the node 1-100, the internode link control unit 4-100 transmits the data reading access to both the main memory bus control unit 3-100 and the coherency control unit 5-100, which is received from the node 1-100 via the broadcast link 1-200. Also, the internode link control unit 4-100 transmits the data write-back access to the main memory bus control unit 3-100, which is received from the node 1-101 via the one-to-one link 1-202. The main memory bus control unit 3-100 transmits the data reading access received from the internode link control unit 4-100 to a main memory via the main memory bus 1-600. Thereafter, the main memory bus control unit 3-100 transmits the read data received from the main memory via the main memory bus 1-600 to the internode link control unit 4-100. Also, the main memory bus control unit 3-100 transmits a data write-back access received from the internode link control unit 4-100 to a main memory via the main memory bus 1-600, and transmits data write-back completion notification to the internode link control unit 4-100. The internode control unit 4-100 transmits the read data received from the main memory bus control unit 3-100 to the node 1-100 via the one-to-one link 1-220. Also, the internode link control unit 4-100 broadcasts the data write-back completion notification received from the main memory bus control unit 3-100 to both the node 1-100 and the node 1-101 via the broadcast link 1-200. Also, the coherency control unit 5-100 refers to a cache tag from the subject address of the data reading access received from the internode link control unit 4-100, and then, transmits such a coherency response which indicates that the data of the subject address is not present in the cache memory on the processor provided by the node 1-100 to the internode link control unit 4-100. The internode link control unit 4-100 transmits the coherency response received from the coherency control unit 5-100 via the coherency link 1-210 to the node 1-100.

On the other hand, in the node 1-101, the internode link control unit 4-101 transmits the data write-back completion notification to the coherency control unit 5-101, which is received from the node 1-100 via the broadcast link 1-200. At this time, the internode link control unit 4-101 detects by the address comparing circuit, such a fact that the data write-back completion notification has passed the data reading access received via the broadcast link 1-200, and then, transmits such a data reading access to which the comparison result has been added to the coherency control unit 5-101. The coherency control unit 5-101 completes the data write-back access in accordance with the data write-back completion notification received from the internode link control unit 4-101. Also, the coherency control unit 5-101 detects that the data write-back completion notification has passed the data reading access to which the comparison result has been added, which is received from the internode link control unit 4-101, and then, transmits such a coherency response which prompts a data re-reading operation to the internode link control unit 4-101. The internode link control unit 4-101 transmits the coherency response received from the coherency control unit 5-101 to the node 1-101 via the coherency link 1-210.

In the node 1-100, the internode link control unit 4-100 transmits the read data received from the node 1-101 to the front side bus control unit 2-100 via the one-to-one link 1-220. Also, the internode link control unit 4-100 transmits the coherency response received from the node 1-100 via the coherency link 1-210 to the coherency control unit 5-100. Further, the internode link control unit 4-100 transmits the coherency response received from the node 1-101 via the coherency link 1-210 to the coherency control unit 5-100. The coherency control unit 5-100 collects the coherency response of the node 1-100 and the coherence response of the node 1-101 received from the internode link control unit 4-100, and transmits data reply notification to the front side bus control unit 2-100, while this data reply notification prompts that the re-read data is transmitted to the processor. Also, the coherency control unit 5-100 transmits a data re-reading access to the internode link control unit 4-100. The front side bus control unit 2-100 discards the read data received from the internode link control unit 4-100 in accordance with the data replay notification received from the coherency control unit 5-100. The internode link control unit 4-100 transmits the data re-reading access received from the coherency control unit 5-100 via the one-to-one link 1-220 to the node 1-100.

In the node 1-100, the internode link control unit 4-100 transmits the data re-reading access to the main memory bus control unit 3-100, which is received from the node 1-100 via the one-to-one link 1-220. The main memory bus control unit 3-100 transmits the data re-dreading access to the main memory via the main memory bus 1-600, which is received from the internode link control unit 4-100. Thereafter, the main memory bus control unit 3-100 transmits the re-read data to the internode link control unit 4-100, which is received from the main memory via the main memory bus 1-600. The internode link control unit 4-100 transmits the re-read data via the one-to-one link 1-220 to the node 1-100, which is received from the main memory bus control unit 3-100.

In the node 1-100, the internode link control unit 4-100 transmits the re-read data to the front side bus control unit 2-100, which is received from the node 1-101 via the front side bus control unit 2-100. The front side bus control unit 2-100 transmits the re-read data via the front side bus 1-400 to the processor, which is received from the internode link control unit 4-100. At this time, since the read data transmitted to the processor corresponds to the data which has been written back, so that the coherency of the data is maintained.

The above descriptions correspond to the embodiment modes of the present invention.

(Modification 1)

In a modification 1 of the present invention, an internode link is constituted by a crossbar switch.

The crossbar switch is constituted by a circuit which orders data reading accesses and data write-back completion notification received from all of the nodes 1-100 to 1-101, and a circuit which broadcasts the ordered data reading accesses and the ordered write-back completion notification to all of the nodes 1-100 to 1-101.

In the case that the internode link is constituted by the crossbar switch, in the broadcast link transmission control unit 4-200 of the internode link control unit 4-100, such a circuit is no longer required which controls a broadcasting operation as to the data reading accesses and the data write-back completion notification. Also, in the broadcast link reception control unit 4-300 of the internode link control unit 4-100, such a circuit is no longer required which orders the data reading accesses and the data write-back completion notification.

(Modification 2)

In another modification 2 of the present invention, an internode link is constituted by a bus.

The bus transmits data reading accesses and data write-back completion notification to all of the nodes 1-100 to 1-101 in the reception order.

In the case that the internode link is constituted by the bus, the broadcast link transmission control unit 4-200 of the internode link control unit 4-100 is equipped with a circuit which detects an idle state of the bus so as to transmit a data reading access and data writ-back completion notification. Also, the broadcast link reception control unit 4-300 of the internode link control unit 4-100 is equipped with a circuit which detects a busy state of the bus so as to receive a data reading access and data write-back completion notification from the bus.

Further, in such a case that the internode link is constituted by the bus, in the broadcast link transmission control unit 4-200 of the internode link control unit 4-100, such a circuit is no longer required which controls a broadcasting operation as to the data reading accesses and the data write-back completion notification. Also, in the broadcast link reception control unit 4-300 of the internode link control unit 4-100, such a circuit is no longer required which orders the data reading accesses and the data write-back completion notification.

In accordance with the shared main memory multiprocessor system and the coherency control method of the data of the present invention, in each of the nodes, the data reading access and the data write-back access can be carried out in accordance with the process condition, and the data reading access to the main memory can be performed in the advance manner. As a result, there are some possibilities that the shared memory multiprocessor system and the coherency control method of the data can be widely utilized so as to improve performance of the tightly-coupled multiprocessor system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A shared memory multiprocessor system in which a plurality of nodes mutually connected to one another via an internode link share data; wherein:

each of said nodes includes: one or more pieces of processors equipped with a cache memory; a main memory; a chip set; a front side bus for connecting said processor to said chip set; and a main memory bus for connecting said main memory to said chip set, said chip set includes: a front side bus control unit; a coherency control unit; a main memory bus control unit;

an internode link control unit; and a cache tag for holding a data cache status of the cache memory provided in the processor connected to said front side bus, said front side bus control unit includes: a circuit for transmitting a data reading access, a data write-back access, and a cache snoop response to said coherency control unit, which are received from the processor via said front side bus; a circuit for transmitting the cache snoop access via said front side bus to the processor, which is received from said coherency control unit; and a circuit for transmitting read data via said front side bus to the processor, which is received from said internode link control unit in accordance with data reply notification received from said coherency control unit, said main memory bus control unit includes: a circuit for transmitting a data reading access and a data write-back access via said main memory bus to a main memory, which are received from said internode link control unit; a circuit for transmitting data write-back completion notification to said internode link control unit in correspondence with the transmission of said data write-back access to said main memory; and a circuit for transmitting the read data to said internode link control unit, which is received via said main memory bus from said main memory, said internode link control unit includes: a circuit for broadcasting both the data reading access received from said coherency control unit and the data write-back completion notification received from said main memory bus control unit to the nodes via said internode link; a circuit for transmitting both the data write-back access and the data re-reading access, which are received from said coherency control unit, via said internode link to a node equipped with a main memory which stores thereinto data of a subject address, and also for transmitting the read data received from said main memory bus control unit via said internode link to a node which issued a subject data reading access; a circuit for transmitting the coherency response received from said coherency control unit via said internode link to a node equipped with the coherency control unit which has transmitted the data reading access; a circuit for selecting the data reading accesses from the nodes via said internode link in synchronism with the nodes so as to order the selected data reading accesses; a circuit for selecting the data writing completion notification received from the nodes via said internode link in synchronism with the nodes so as to order the selected data writing completion notification; a circuit for comparing a subject address of said ordered data reading access with a subject address of said ordered data writing completion notification and for adding the comparison result to the data reading access; a circuit for transmitting said data reading access to which said comparison result is added to both said coherency control unit and said main memory control unit; a circuit for transmitting said ordered data writing completion notification to said coherency control unit; a circuit for transmitting the read data to said front side control unit, which are received from the nodes via said internode link; a circuit for transmitting both the data write-back accesses and the data re-reading accesses to said main memory control unit, which are received from the nodes via said internode link; and a circuit for transmitting the coherency responses to said coherency control unit, which are received from the nodes via said internode link, and wherein:

said coherency control unit includes: a circuit for transmitting the data reading access and the write-back access to said internode link control unit, which are received from said front side bus control unit; a circuit for referring to said cache tag from the subject address of the data reading access to which said comparison result is added and which is received from said internode link control unit so as to judge a data cache state of the processor connected to said front side bus; a circuit for transmitting a cache snoop access to said front side bus control unit in accordance with the judgment of said data cache state; a circuit for producing a coherency response by combining said data cache state with the cache snoop response received from said front side bus control unit, and for transmitting the produced coherency response to said internode link control unit; a circuit for producing data reply notification in accordance with the coherency response received from the internode link control unit so as to transmit said produced data reply notification to said front bus control unit, and for producing a data re-reading access so as to transmit the produced data re-reading access to said internode link control unit; and a circuit for completing the transmitted data write-back in accordance with the data write-back completion notification received from said internode link control unit.

2. The shared memory multiprocessor system as claimed in claim 1 wherein:

said internode link is a crossbar switch; and instead of the circuit for broadcasting said data reading accesses and said data write-back completion notification to the nodes, the circuit for ordering said data reading accesses, and the circuit for ordering said data write-back completion notification, which are provided respectively in said internode link control unit of the chip set of each of the nodes, said crossbar switch includes: a circuit for ordering the data reading accesses received from the nodes; a circuit for ordering the dab write-back completion notification received from the nodes; a circuit for broadcasting said ordered data reading accesses to the nodes; and a circuit for broadcasting said ordered data write-back completion notification to the nodes.

3. The shared memory multiprocessor system as claimed in claim 1 wherein:

said internode link is a bus; and instead of the circuit for broadcasting said data reading accesses and said data write-back completion notification to the nodes, the circuit for ordering said data reading accesses, and the circuit for ordering said data write-back completion notification, which are provided respectively in said internode link control unit of the chip set of each of the nodes, said bus includes a circuit for detecting an idle state of the bus so as to transmit the data reading access to the bus; a circuit for detecting an idle state of the bus so as to transmit the data write-back notification to the bus; a circuit for detecting a busy state of the bus so as to receive the data reading accesses; and a circuit for detecting a busy state of the bus so as to receive the data write-back completion notification from the bus.

4. A coherency control method of data in a shared memory multiprocessor system in which a plurality of nodes share data and each of the nodes is equipped with one or more pieces of processors having a cache memory, one, or more pieces of main memories; and a chip set; wherein:

when both a data reading access and a data write-back access with respect to the same main memory address are issued on a system, transmitting said data reading access to a subject main memory and reading data which has not yet been written back, and thereafter, transmitting said data write-back access to the subject main memory, in the case that such a node is present where a data cache state, of a cache memory provided in a processor with respect to said data reading access, is confirmed after said data write-back access is completed, monitoring the completion of said data write-back access in synchronism with the nodes, and transmitting, by such a node where said data reading access is passed by the completion of said data write-back access, coherency response for prompting a re-reading operation of data to the node which issued said data reading access; and after the node which issued said data reading access receives said coherency response, re-reading write-back data from the subject main memory, discarding said data which has not yet been written back, and issuing a data re-reading access to the main memory without requesting a retry operation to the processor.

5. A chip set, residing at a node of a shared memory multiprocessor system in which a plurality of nodes share data and each of the nodes is equipped with one or more pieces of processors having a cache memory, one or more pieces of main memories, for maintaining coherency control of data, comprising:

a front side bus control unit configured to transmit and receive data from a processor at the node;

a cache tag for holding a data cache state of the cache memory provided in the processor connected to a front side bus;

a coherency control unit configured to maintain coherency of data of a data reading access and a data-write back access with reference to said cache tag;

a main memory bus control unit configured to transmit and receive data between the chip set and main memory;

an internode link control unit configured to transmit and receive data via at least one internode link with another node;

wherein, when both a data reading access and a data write-back access with respect to the same main memory address are issued on a system, said data reading access is transmitted via the main memory bus control unit to a subject main memory and data which has not yet been written back is received by the main memory bus control unit, and thereafter, said data write-back access to the subject main memory is transmitted via the main memory bus control unit, in the case that such a node is present where the data cache state of the cache memory provided in a processor with respect to said data read access is confirmed by the coherency control unit after said data write-back access is completed, the completion of said data-write back access is monitored in synchronism with the nodes, and such a node where said data reading access is passed by the completion of said data write-back access transmits, via the internode link control unit, a coherency response for promoting a re-reading operation of data to the node which issued said data reading access; and after the node which issued said data reading access receives said coherency response, write-back data is re-read from the subject main memory, said data which has not yet been written back is discarded, and the coherence control unit issues a data re-reading access to the main memory without requesting a retry operation to the processor.

* * * * *